Feb. 14, 1956   R. A. LUCAS   2,734,663
CONDIMENT SHAKER
Filed March 19, 1953

Randolph A. Lucas
INVENTOR.

BY *Clarence A. O'Brien*
*and Harvey B. Jackson*
Attorneys

United States Patent Office 2,734,663
Patented Feb. 14, 1956

2,734,663
CONDIMENT SHAKER
Randolph A. Lucas, San Pedro, Calif.

Application March 19, 1953, Serial No. 343,308

2 Claims. (Cl. 222—142.1)

This invention relates generally to condiment containers and more particularly pertains to an improved form of condiment shaker provided with novel closure means both for the outlet openings and for the filler openings.

The primary object of this invention is to provide a condiment shaker provided with a partition means for presenting compartments within the receptacle for holding different kinds of condiments, such as pepper and salt.

Another object of this invention is to provide a condiment shaker with improved means for selectively uncovering the shaker openings of the various condiments disposed therein.

Another object of this invention is to provide a condiment shaker provided with an improved form filler opening cover, the improvement taking the form of a slide member received in opposite side walls of the receptacle so as to be moved selectively to a covering and uncovering relation with filler openings provided in the bottom of the shaker.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
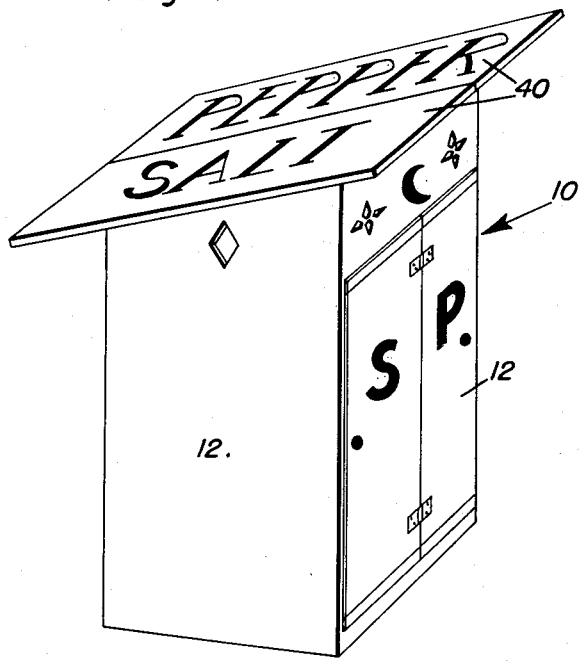
Figure 1 is a perspective view of the improved condiment shaker.

Referring now more particularly to the drawing, reference numeral 10 indicates generally the main body portion of the condiment shaker and includes a plurality of side walls 12 arranged in rectangular relation and an opposed pair of side walls are provided with vertical grooves 14 for receiving the opposite sides of the partition member 16 which divides the receptacle into a pair of juxtaposed chambers 18 and 20 for the reception of different kinds of condiments. Each of the side walls is provided with a horizontal groove 22 adjacent their bottom edge, each of which receives a corresponding side of a bottom 24. The bottom wall is provided with a pair of apertures or openings 26, one of each in register with one of the condiment chambers so that by inverting the shaker, the supply of condiments within the chambers may be replenished.

Figure 3:
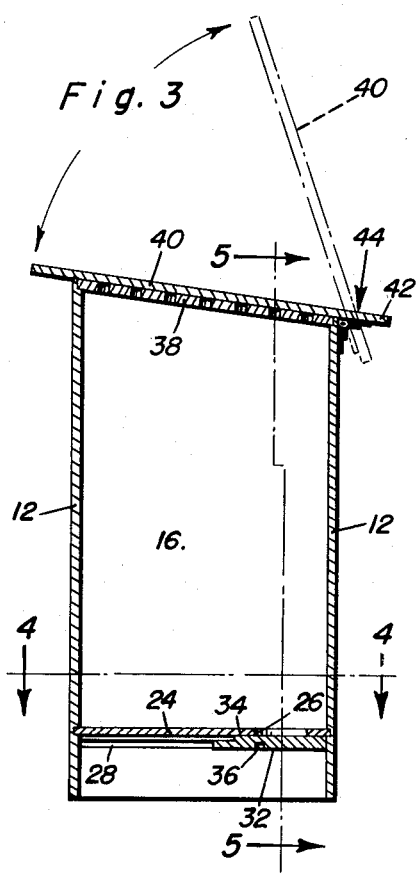
Figure 3 is a vertical section taken through the shaker showing the shaker opening closure member in the closed and open position, the latter being shown in dotted lines.
Figure 2:
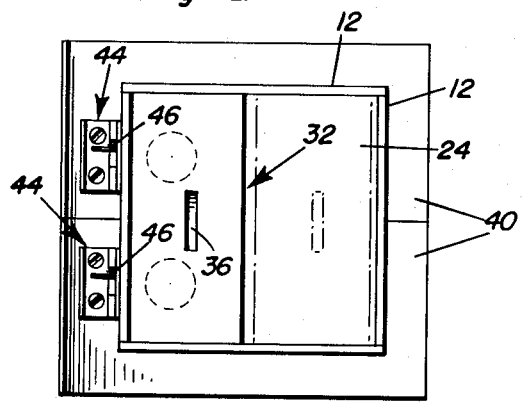
Figure 2 is a bottom plan view of the shaker showing the slide member in closed and open position, the latter being shown in dotted lines.
Figure 4:
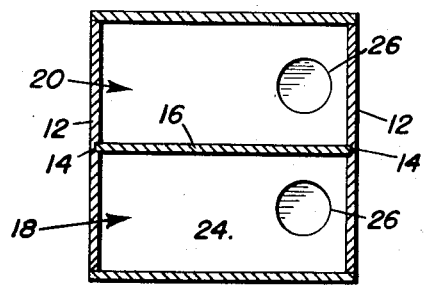
Figure 4 is a horizontal section taken substantially along the plane of section line 4—4 of Figure 3, showing details of internal construction.
Figure 5:
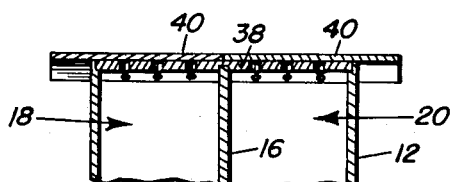
Figure 5 is a vertical elevation partially broken away taken substantially along the plane of section line 5—5 of Figure 3, showing further relationship of the parts.
Figure 5:
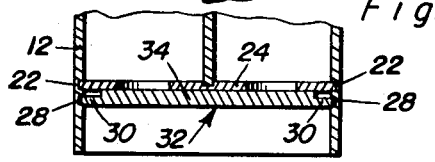

An opposed pair of the side walls are provided adjacent their lower edges and beneath the bottom 24 with horizontal guide grooves 28 which slidably receive the opposite ends 30 of a closure member 32, which closure incorporates an upraised portion 34 medially thereof to engage against the lower surface of the bottom to effectively seal the filler openings. As will be readily appreciated from Figure 3, the closure member is of less width than half the distance between the inner surfaces of the side walls between which it is slid so that by engagement with the groove 36, a person may selectively cover and uncover the filler openings as desired.

The top edges of the shaker are sloped toward one side wall to simulate a roof and recessed within the open top end thereof is a perforate top member 38 through which the condiment is dispensed when the shaker is inverted and shaken. A pair of cover members 40 are disposed in overlying relation to the top and project outwardly of the side walls presenting a finger lever portion 42 at one side thereof. The leaves of a hinge 44 are secured respectively to each of the cover members and the rear side wall so that the cover members are independently manipulable to an uncovering position with relation to the top by merely pressing downwardly on the corresponding finger portion 42.

To normally urge the cover members to a closed position overlying the top, a coil spring 46 is wound about the pintle of each hinge and is provided with laterally projecting free ends which engage against corresponding leaves of each hinge to preload the cover members so as to normally engage upon the top.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A condiment shaker comprising a rectangular receptacle having side walls and a bottom, a partition in said receptacle presenting a pair of juxtaposed chambers for receiving salt and pepper respectively, a perforate top for said receptacle, a closure member overlying said top, a hinge having cooperating hinge leaves secured respectively to one of said side walls and said member, said member projecting beyond the hinge connection to said one side wall, means on said hinge for normally urging said member into overlying relation with said top, said bottom being secured above the lower edge of said side walls and provided with a pair of filler apertures communicating with respective chambers, a single slide member movable into and out of covering relation to said apertures.

2. A condiment shaker comprising a rectangular receptacle having side walls and a bottom, a partition in said receptacle presenting a pair of juxtaposed chambers for receiving salt and pepper respectively, a perforate top for said receptacle, a closure member overlying said top, a hinge having cooperating hinge leaves secured respectively to one of said side walls and said member, said member projecting beyond the hinge connection to said one side wall, means on said hinge for normally urging said member into overlying relation with said top, said bottom being secured above the lower edge of said side walls and provided with a pair of filler apertures communicating with respective chambers, a single slide member movable into and out of covering relation to said apertures, and an opposed pair of said side walls being provided with guide grooves below said bottom, said slide member having opposite ends received in said grooves.

References Cited in the file of this patent

UNITED STATES PATENTS

| | | |
|---|---|---|
| 743,626 | Duffie | Nov. 10, 1903 |
| 801,073 | Fulton | Oct. 3, 1905 |
| 1,209,318 | Mitchell | Dec. 19, 1916 |
| 1,417,444 | Blair | May 23, 1922 |
| 1,473,782 | Doble | Nov. 13, 1923 |
| 2,000,818 | Bomberger | May 7, 1935 |
| 2,182,623 | Dolar | Dec. 5, 1939 |
| 2,411,489 | Williams | Nov. 19, 1946 |